US012643973B2

(12) United States Patent (10) Patent No.: US 12,643,973 B2
Homma (45) Date of Patent: Jun. 2, 2026

(54) RESIN COMPOSITION, OPTICAL FIBER, AND METHOD FOR PRODUCING OPTICAL FIBER

(71) Applicant: SUMITOMO ELECTRIC INDUSTRIES, LTD., Osaka (JP)

(72) Inventor: Yuya Homma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 505 days.

(21) Appl. No.: 18/029,404

(22) PCT Filed: Sep. 17, 2021

(86) PCT No.: PCT/JP2021/034401
§ 371 (c)(1),
(2) Date: Mar. 30, 2023

(87) PCT Pub. No.: WO2022/075050
PCT Pub. Date: Apr. 14, 2022

(65) Prior Publication Data
US 2023/0357480 A1 Nov. 9, 2023

(30) Foreign Application Priority Data

Oct. 5, 2020 (JP) ................................ 2020-168361

(51) Int. Cl.
| | |
|---|---|
| *C08F 290/06* | (2006.01) |
| *C03C 25/1065* | (2018.01) |
| *C03C 25/326* | (2018.01) |
| *C09D 175/12* | (2006.01) |
| *G02B 6/02* | (2006.01) |

(52) U.S. Cl.
CPC ...... *C08F 290/067* (2013.01); *C03C 25/1065* (2013.01); *C03C 25/326* (2013.01); *C09D 175/12* (2013.01); *G02B 6/02395* (2013.01)

(58) Field of Classification Search
CPC ............. C08F 290/067; C03C 25/1065; C03C 25/326; C09D 175/12; G02B 6/02395
See application file for complete search history.

(56) References Cited

U.S. PATENT DOCUMENTS

| | | | |
|---|---|---|---|
| 6,489,015 B1 * | 12/2002 | Tsuchiya ................... | C08J 7/046 |
| | | | 428/218 |
| 7,257,299 B2 | 8/2007 | Chien et al. | |

(Continued)

FOREIGN PATENT DOCUMENTS

| | | | | |
|---|---|---|---|---|
| AU | 2018219661 A1 * | 8/2019 | ............. | C09D 11/30 |
| CA | 3053037 A1 * | 8/2018 | ............. | C09D 11/30 |

(Continued)

OTHER PUBLICATIONS

AU-2018219661-A1 English Language Text (Year: 2019).*

(Continued)

*Primary Examiner* — Peter Radkowski
(74) *Attorney, Agent, or Firm* — Faegre Drinker Biddle & Reath LLP

(57) ABSTRACT
A resin composition for secondary coating of an optical fiber includes a photopolymerizable compound including a urethane (meth)acrylamide, and a photopolymerization initiator. The urethane (meth)acrylamide has a (meth)acrylamide group at at least one end of a urethane bond.

9 Claims, 1 Drawing Sheet

(56) References Cited

U.S. PATENT DOCUMENTS

| | | | |
|---|---|---|---|
| 9,447,295 B2 * | 9/2016 | Guenther | C09D 11/30 |
| 10,427,392 B2 * | 10/2019 | Iwase | B32B 9/00 |
| 10,676,561 B2 * | 6/2020 | Hirata | C09D 11/30 |
| 10,712,476 B2 * | 7/2020 | Iwase | C09D 175/14 |
| 10,745,576 B2 * | 8/2020 | Fleckenstein | C09D 4/00 |
| 10,759,897 B2 * | 9/2020 | Takenouchi | C08J 7/043 |
| 2001/0025062 A1 * | 9/2001 | Szum | C03C 25/106 |
| | | | 522/96 |
| 2003/0091310 A1 | 5/2003 | Myers | |
| 2004/0110858 A1 * | 6/2004 | Biro | C08F 290/14 |
| | | | 522/100 |
| 2004/0110859 A1 * | 6/2004 | Biro | C08L 33/04 |
| | | | 522/100 |
| 2005/0267230 A1 * | 12/2005 | Esaki | C08L 75/16 |
| 2014/0079367 A1 | 3/2014 | Wu et al. | |
| 2015/0191607 A1 * | 7/2015 | McDaniel | C09D 5/1625 |
| | | | 424/94.64 |
| 2016/0193852 A1 * | 7/2016 | Guenther | C09D 11/101 |
| | | | 347/102 |
| 2016/0318013 A1 * | 11/2016 | Yin | C07C 233/38 |
| 2017/0009001 A1 | 1/2017 | Takenouchi et al. | |
| 2017/0320307 A1 * | 11/2017 | Iwase | G02F 1/133614 |
| 2018/0244831 A1 * | 8/2018 | Hirata | C08G 18/6705 |
| 2018/0244832 A1 * | 8/2018 | Takenouchi | C08G 18/672 |
| 2018/0364398 A1 * | 12/2018 | Iwase | C09J 175/14 |
| 2019/0375954 A1 * | 12/2019 | Fleckenstein | C08L 75/14 |
| 2020/0247098 A1 * | 8/2020 | Tokita | B32B 27/281 |
| 2020/0247932 A1 * | 8/2020 | Share | C08G 18/672 |
| 2021/0009854 A1 | 1/2021 | Hamakubo | |

FOREIGN PATENT DOCUMENTS

| | | | | | |
|---|---|---|---|---|---|
| CN | 110256902 | A | * | 9/2019 | C09D 11/30 |
| EP | 3 121 209 | A1 | | 1/2017 | |
| EP | 3033399 | B1 | * | 10/2017 | C09D 11/101 |
| ES | 2655486 | T3 | * | 2/2018 | C09D 11/106 |
| GB | 2561984 | A | * | 10/2018 | C09D 11/38 |
| GB | 2562169 | A | * | 11/2018 | C09D 11/38 |
| JP | S63-239139 | A | | 10/1988 | |
| JP | 2001302742 | A | * | 10/2001 | |
| JP | 2002338640 | A | * | 11/2002 | |
| JP | 2005-089586 | A | | 4/2005 | |
| JP | 2006-036989 | A | | 2/2006 | |
| JP | 2009-203360 | A | | 9/2009 | |
| JP | 2009197163 | A | * | 9/2009 | |
| JP | 2009-237284 | A | | 10/2009 | |
| JP | 2012111674 | A | * | 6/2012 | |
| JP | 2016-098127 | A | | 5/2016 | |
| JP | 2016-522428 | A | | 7/2016 | |
| JP | 2017141125 | A | * | 8/2017 | |
| JP | 2017141126 | A | * | 8/2017 | |
| KR | 20190112120 | A | * | 10/2019 | C09D 11/30 |
| WO | WO-2005/026228 | A1 | | 3/2005 | |
| WO | WO-2008076297 | A1 | * | 6/2008 | C08G 18/755 |
| WO | WO-2008076302 | A1 | * | 6/2008 | C03C 25/10 |
| WO | WO-2009/108055 | A1 | | 9/2009 | |
| WO | WO-2011049607 | A1 | * | 4/2011 | C08G 18/246 |
| WO | WO-2014/172143 | A1 | | 10/2014 | |
| WO | WO-2015022228 | A1 | * | 2/2015 | C09D 11/101 |
| WO | 2015/141537 | A1 | | 9/2015 | |
| WO | WO-2018146259 | A1 | * | 8/2018 | C08L 67/06 |
| WO | WO-2019159977 | A1 | * | 8/2019 | C08F 290/06 |
| WO | WO-2020064523 | A1 | * | 4/2020 | B29C 64/124 |
| WO | 2020/101030 | A1 | | 5/2020 | |

OTHER PUBLICATIONS

CN-110256902-A English Language Text (Year: 2019).*
EP-3033399-B1 English Language Text (Year: 2017).*
ES-2655486-T3 English Language Text (Year: 2018).*
GB-2561984-A English Language Text (Year: 2018).*
GB-2562169-A English Language Text (Year: 2018).*
JP-2001302742-A English Language Text (Year: 2001).*
JP-2002338640-A English Language Text (Year: 2002).*
JP-2009197163-A English Language Text (Year: 2009).*
JP-2012111674-A English Language Text (Year: 2012).*
JP-2017141125-A English Language Text (Year: 2017).*
JP-2017141126-A English Language Text (Year: 2017).*
KR-20190112120-A English Language Text (Year: 2019).*
WO-2008076297-A1 English Language Text (Year: 2008).*
WO-2008076302-A1 English Language Text (Year: 2008).*
WO-2011049607-A1 English Language Text (Year: 2011).*
WO-2015022228-A1 English Language Text (Year: 2015).*
WO-2018146259-A1 English Language Text (Year: 2018).*
WO-2019159977-A1 English Language Text (Year: 2019).*
WO-2020064523-A1 English Language Text (Year: 2020).*
CA-3053037-A1 English Language Text (Year: 2018).*
Khudyakov, Igor & Specialties, Bomar & Todd, & Gantt, W & Labs, Harmony & Purvis, Michael & Overton, Bob. (2019). New Developments in UV-Curable Urethane Acrylate Coatings. RadTech—The Association for UV & EB Technology. (Year: 2019).*
Second Chinese Office Action issued Sep. 29, 2024 in Application No. 202180065580.0.
Liu Guojie, "Modern Coating Technology and New Techniques," China Light Industry Press, 20000430, p. 146.
Wu Herong, "Polymer Physics," East China Institute of Chemical Technology Press, Dec. 31, 1990, p. 249-p. 251.

* cited by examiner

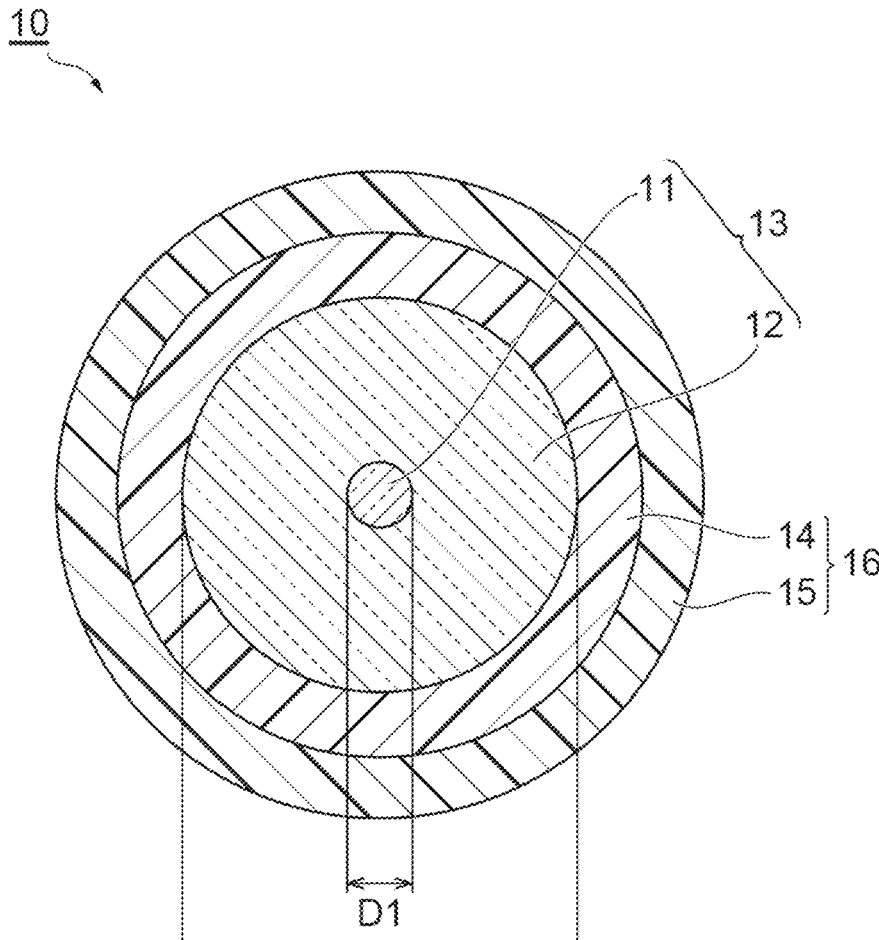

1

RESIN COMPOSITION, OPTICAL FIBER, AND METHOD FOR PRODUCING OPTICAL FIBER

TECHNICAL FIELD

The present disclosure relates to a resin composition for secondary coating of an optical fiber, an optical fiber, and a method for producing an optical fiber.

This application claims priority based on Japanese Patent Application No. 2020-168361 filed on Oct. 5, 2020, the entire contents of which are incorporated herein by reference.

BACKGROUND ART

Generally, an optical fiber includes a coating resin layer for protecting a glass fiber, which is an optical transmission medium. The coating resin layer is composed of two layers, for example, a primary resin layer in contact with the glass fiber and a secondary resin layer formed on the outer layer of the primary resin layer. It is known that urethane (meth) acrylate, which is a reactant of polyol, diisocyanate, and hydroxyl group-containing (meth)acrylate, is used as a resin composition for secondary coating of an optical fiber. For example, PTL 1 to PTL 3 describe a resin composition for secondary coating containing urethane (meth)acrylate.

CITATION LIST

Patent Literature

PTL 1: JP 2016-098127 A
PTL 2: JP 2006-036989 A
PTL 3: JP 2005-089586 A

SUMMARY OF INVENTION

A resin composition for secondary coating of an optical fiber according to an embodiment of the present disclosure includes a photopolymerizable compound including a urethane (meth)acrylamide and a photopolymerization initiator. The urethane (meth)acrylamide has a (meth)acrylamide group at at least one end of a urethane bond.

An optical fiber according to an embodiment of the present disclosure includes a glass fiber including a core and a cladding, a primary resin layer covering the glass fiber so as to be in contact with the glass fiber, and a secondary resin layer covering the primary resin layer. The secondary resin layer includes a cured product of the resin composition described above.

A method for producing an optical fiber according to an embodiment of the present disclosure includes applying the resin composition described above to an outer periphery of a glass fiber including a core and a cladding and curing the resin composition by ultraviolet irradiation after the applying.

BRIEF DESCRIPTION OF DRAWINGS

FIG. 1 is a schematic cross-sectional view showing an example of an optical fiber according to an embodiment of the present disclosure.

DESCRIPTION OF EMBODIMENTS

Problems to be Solved by Present Disclosure

It is important that the secondary resin layer of the optical fiber has a high Young's modulus in order to enhance the microbending resistance. In addition, it is also important that the secondary resin layer of the optical fiber has excellent external damage resistance in order to suppress appearance defects caused by surface abrasion. However, when the production rate of the optical fiber is increased in order to improve the productivity of the optical fiber, the conventional resin composition for secondary coating tends to be insufficiently cured, and there is room for improvement in the Young's modulus and external damage resistance of the formed secondary resin layer.

An object of the present disclosure is to provide a resin composition capable of forming a secondary resin layer of an optical fiber having a high Young's modulus and excellent external damage resistance even when a production rate of the optical fiber is high, and an optical fiber having excellent productivity.

Advantageous Effects of Present Disclosure

According to the present disclosure, it is possible to provide a resin composition capable of forming a secondary resin layer of an optical fiber having a high Young's modulus and excellent external damage resistance even when the production rate of the optical fiber is high, and an optical fiber having excellent productivity.

Description of Embodiments of Present Disclosure

First, the contents of embodiments of the present disclosure will be listed and explained. A resin composition for secondary coating of an optical fiber according to an embodiment of the present disclosure includes a photopolymerizable compound including a urethane (meth)acrylamide and a photopolymerization initiator. The urethane (meth) acrylamide has a (meth)acrylamide group at at least one end of a urethane bond. Such a resin composition may form a secondary resin layer having a high Young's modulus and excellent external damage resistance even when the production rate of the optical fiber is high, thereby improving the productivity of the optical fiber.

In terms of forming a secondary resin layer having a higher Young's modulus and more excellent external damage resistance, the urethane (meth)acrylamide may include a urethane oligomer having a (meth)acrylamide group at one end of a urethane bond, a urethane oligomer having (meth) acrylamide groups at both ends of a urethane bond, or a mixture of the urethane oligomers.

The urethane oligomer having a (meth)acrylamide group at one end of a urethane bond may include a urethane oligomer having a (meth)acrylamide group at one end of a urethane bond and having a (meth)acryloyloxy group at the other end.

In terms of forming a secondary resin layer having a higher Young's modulus and more excellent external damage resistance, the urethane (meth)acrylamide may have a number-average molecular weight of 500 to 6000.

In terms of forming a secondary resin layer having a higher Young's modulus and more excellent external damage resistance, a content of the urethane (meth)acrylamide may be 5 parts by mass to 60 parts by mass based on 100 parts by mass of a total amount of the resin composition.

In terms of applying appropriate toughness to the secondary resin layer, the photopolymerizable compound may further include a (meth)acrylic acid ester.

In terms of applying appropriate toughness to the secondary resin layer, the (meth)acrylic acid ester may include a (meth)acrylate having a bisphenol skeleton.

An optical fiber according to an embodiment of the present disclosure includes a glass fiber including a core and a cladding, a primary resin layer covering the glass fiber so as to be in contact with the glass fiber, and a secondary resin layer covering the primary resin layer. The secondary resin layer includes a cured product of the resin composition described above. Such an optical fiber includes a secondary resin layer having a high Young's modulus and excellent external damage resistance, and thus has excellent productivity.

A method for producing an optical fiber according to an embodiment of the present disclosure includes applying the resin composition described above to an outer periphery of a glass fiber including a core and a cladding and curing the resin composition by ultraviolet irradiation after the applying. According to the method for producing an optical fiber, a secondary resin layer having a high Young's modulus and excellent external damage resistance can be formed even when the production rate of the optical fiber is high, and an optical fiber having excellent productivity can be manufactured.

Details of Embodiments of Present Disclosure

Specific examples of the resin composition and the optical fiber according to the embodiment of the present disclosure will be described with reference to the drawings if necessary. The present disclosure is not limited to these examples and is defined by the scope of the claims, and is intended to include all modifications within the meaning and scope equivalent to the scope of the claims. In the following description, the same elements are denoted by the same reference numerals in the description of the drawings, and redundant description is omitted. The term "(meth)acrylamide" as used herein means acrylamide or the corresponding methacrylamide. The same applies to similar expressions such as (meth)acrylate.

(Resin Composition)

A resin composition according to an embodiment of the present disclosure includes a photopolymerizable compound including a urethane (meth)acrylamide and a photopolymerization initiator. The urethane (meth)acrylamide has a (meth)acrylamide group at at least one end of a urethane bond. Since the (meth)acrylamide group is more excellent in photo-polymerization property than the (meth)acryloyloxy group, the urethane (meth)acrylamide has a higher curing rate than the urethane (meth)acrylate, thereby improving the productivity of the optical fiber.

The urethane (meth)acrylamide may include a urethane oligomer having a (meth)acrylamide group at one end of a urethane bond, a urethane oligomer having (meth)acrylamide groups at both ends of a urethane bond, or a mixture thereof, in terms of forming a secondary resin layer having a higher Young's modulus and more excellent external damage resistance.

In terms of forming a secondary resin layer having a higher Young's modulus and more excellent external damage resistance, the urethane (meth)acrylamide preferably includes a urethane oligomer having (meth)acrylamide at both ends of the urethane bond. The urethane oligomer having (meth)acrylamide groups at both ends of the urethane bond may be a reactant of polyol, diisocyanate, and N-hydroxyalkyl (meth)acrylamide.

The urethane oligomer having a (meth)acrylamide group at one end of the urethane bond may include a urethane oligomer having a (meth)acrylamide group at one end of the urethane bond and a (meth)acryloyloxy group at the other end of the urethane bond. The urethane oligomer may be a reactant of polyol, diisocyanate, N-hydroxyalkyl (meth) acrylamide, and hydroxyl group-containing (meth)acrylate.

Examples of the polyol include polyether polyols, polyester polyols, polycaprolactone polyols, polycarbonate polyols, polybutadiene polyols, and a bisphenol A-ethylene oxide adduct diol. Examples of the polyether polyols include polytetramethylene ether glycol, polyethylene glycol, and polypropylene glycol. The polyol may be used alone or in combination of two or more kinds thereof. In terms of easy adjustment of the Young's modulus and elongation at break of the secondary resin layer, at least one selected from the group consisting of polypropylene glycol, polytetramethylene ether glycol, and polycarbonate polyols is preferably used as the polyol.

A number-average molecular weight (Mn) of the polyol is preferably 300 to 2500, more preferably 400 to 2400, and still more preferably 500 to 2300 in terms of forming a strong secondary resin layer. From the same viewpoint, the urethane (meth)acrylamide preferably includes a structural unit derived from a polyol having a number-average molecular weight of 300 to 2500, more preferably includes a structural unit derived from a polyol having a number-average molecular weight of 400 to 2400, and still more preferably includes a structural unit derived from a polyol having a number-average molecular weight of 500 to 2300.

Examples of the diisocyanate include 2,4-tolylene diisocyanate, 2,6-tolylene diisocyanate, isophorone diisocyanate, dicyclohexylmethane diisocyanate, diphenylmethane diisocyanate, hexamethylene diisocyanate, xylylene diisocyanate, hydrogenated xylylene diisocyanate, 1,5-naphthalene diisocyanate, norbornene diisocyanate, 1,5-pentamethylene diisocyanate, tetramethylxylylene diisocyanate, and trimethylhexamethylene diisocyanate. The diisocyanate may be used alone, or two or more thereof may be used in combination.

Examples of the N-hydroxyalkyl (meth)acrylamide include N-hydroxymethyl (meth)acrylamide, N-hydroxyethyl (meth)acrylamide, and N, N-dimethylol (meth)acrylamide. The N-hydroxyalkyl (meth)acrylamide may be used alone or in combination of two or more kinds thereof. In terms of forming a secondary resin layer having a higher Young's modulus and more excellent external damage resistance, it is preferable to use N-hydroxyethyl acrylamide as the N-hydroxyalkyl (meth)acrylamide.

Examples of the hydroxyl group-containing (meth)acrylate include 2-hydroxyethyl (meth)acrylate, 2-hydroxypropyl (meth)acrylate, 2-hydroxybutyl (meth)acrylate, caprolactone (meth)acrylate, 2-hydroxy-3-phenoxypropyl (meth) acrylate, 2-(meth)acryloyloxyethyl-2-hydroxyethyl phthalic acid, 2-hydroxy-O-phenylphenolpropyl (meth)acrylate, 2-hydroxy-3-methacrylpropyl acrylate, trimethylolpropane di(meth)acrylate, and pentaerythritol tri(meth)acrylate. The hydroxyl group-containing (meth)acrylate may be used alone or in combination of two or more kinds thereof. As the hydroxyl group-containing (meth)acrylate, it is preferable to use at least one selected from the group consisting of 2-hydroxyethyl (meth)acrylate, 2-hydroxypropyl (meth) acrylate, and 2-hydroxybutyl (meth)acrylate.

Examples of a method of synthesizing urethane (meth) acrylamide include a method in which polyol and diisocyanate are reacted to obtain a prepolymer having an isocyanate group at the end (hereinafter also referred to as "NCO end prepolymer") and then N-hydroxyalkyl (meth)acrylamide (optionally hydroxyl group-containing (meth)acrylate) is reacted; a method in which diisocyanate and N-hydroxyalkyl (meth)acrylamide (optionally hydroxyl group-containing (meth)acrylate) are reacted and then polyol is reacted; and a method in which polyol, diisocyanate, and N-hydroxyalkyl (meth)acrylamide (optionally hydroxyl group-containing (meth)acrylate) are simultaneously reacted.

When a polyol having two functional groups is used, a method in which a hydroxyl group (OH) of the polyol is reacted with an isocyanate group (NCO) of a diisocyanate and then reacted with N-hydroxyalkyl (meth)acrylamide (if necessary, a hydroxyl group-containing (meth)acrylate) is preferable. When a polyol having three or more functional groups is used, a method in which a diisocyanate is reacted with N-hydroxyalkyl (meth)acrylamide (if necessary, a hydroxyl group-containing (meth)acrylate) and then reacted with the polyol is preferable.

Hereinafter, preparation of urethane (meth)acrylamide will be described with reference to specific examples. For example, polypropylene glycol is used as polyol, 2,4-tolylene diisocyanate is used as diisocyanate, N-hydroxyethyl acrylamide is used as N-hydroxyalkyl (meth)acrylamide, and 2-hydroxyethyl acrylate is used as hydroxyl group-containing (meth)acrylate.

First, polypropylene glycol and 2,4-tolylene diisocyanate are reacted to synthesize the NCO end prepolymer. Subsequently, the NCO end prepolymer is reacted with N-hydroxyethyl acrylamide and 2-hydroxyethyl acrylate to synthesize a urethane oligomer including urethane acrylamide. The synthesized urethane oligomer can be represented as a mixture of urethane acrylamide of the following formulae (1) and (2) and urethaneacrylate of the following formula (3). The following formulae (4) to (6) are by-products called adduct products contained in the reactant and function as one kind of monomer.

$$Am\text{—}(U\text{—}I\text{—}U\text{—}P)n\text{-}U\text{—}I\text{—}U\text{—}Am \qquad (1)$$

$$Am\text{—}(U\text{—}I\text{—}U\text{—}P)n\text{-}U\text{—}I\text{—}U\text{—}Ac \qquad (2)$$

$$Ac\text{—}(U\text{—}I\text{—}U\text{—}P)n\text{-}U\text{—}I\text{—}U\text{—}Ac \qquad (3)$$

$$Am\text{—}U\text{—}I\text{—}U\text{—}Am \qquad (4)$$

$$Am\text{—}U\text{—}I\text{—}U\text{—}Ac \qquad (5)$$

$$Ac\text{—}U\text{—}I\text{—}U\text{—}Ac \qquad (6)$$

Here, Am represents a residue of N-hydroxyethyl acrylamide, Ac represents a residue of 2-hydroxyethyl acrylate, U represents a urethane bond, I represents a residue of 2,4-tolylene diisocyanate, P represents a residue of polypropylene glycol, and n is an integer of 1 or more.

When urethane (meth)acrylamide is prepared, addition of 2-hydroxyethyl acrylate is optional, and when 2-hydroxyethyl acrylate is not added, (1) is produced as a main component and (4) is produced as a by-product.

When the polyol and the diisocyanate are reacted with each other, the molar ratio (NCO/OH) of the isocyanate group (NCO) of the diisocyanate to the hydroxyl group (OH) of the polyol is preferably 1.1 to 6.0, more preferably 1.2 to 5.0, still more preferably 1.3 to 4.0, and particularly preferably 1.4 to 3.0. NCO/OH may be 1.5 or more, 1.7 or more, or 1.9 or more, and may be 2.5 or less, 2.3 or less, or 2.1 or less. The molar ratio of the hydroxyl group of the N-hydroxyalkyl (meth)acrylamide to the NCO of the NCO end prepolymer is preferably 0.10 to 1.15, more preferably 0.20 to 1.10, still more preferably 0.30 to 1.10, particularly preferably 0.40 to 1.10, and extremely preferably 0.50 to 1.10. The molar ratio of the hydroxyl group of the N-hydroxyalkyl (meth)acrylamide to the NCO of the NCO end prepolymer may be 0.60 or more, 0.70 or more, 0.80 or more, or 0.90 or more, and may be 1.09 or less, 1.08 or less, 1.07 or less, or 1.06 or less. The molar ratio of the hydroxyl group of the hydroxyl group-containing (meth)acrylate to the NCO of the NCO end prepolymer is preferably 0 to 0.95, more preferably 0 to 0.90, still more preferably 0 to 0.80, particularly preferably 0 to 0.70, and extremely preferably 0 to 0.60. The ratio of the total number of moles of hydroxyl groups in the N-hydroxyalkyl (meth)acrylamide and hydroxyl group-containing (meth)acrylate to the number of moles of NCO in the NCO end prepolymer is preferably 1.00 to 1.15, more preferably 1.03 to 1.10.

As a catalyst for synthesizing urethane (meth)acrylamide, for example, an organotin compound and an amine compound can be used. Examples of the organotin compound may include dibutyltin dilaurate, dibutyltin diacetate, dibutyltin maleate, dibutyltin bis (2-ethylhexyl mercaptoacetate), dibutyltin bis (isooctyl mercaptoacetate), and dibutyltin oxide. The catalyst may be used alone or in combination of two or more kinds thereof. From the viewpoint of availability or catalyst performance, dibutyltin dilaurate or dibutyltin diacetate is preferably used as the catalyst.

The Mn of the urethane (meth)acrylamide is preferably 500 to 6000, more preferably 600 to 5500, still more preferably 700 to 5000, and particularly preferably 1000 to 4000. When the Mn of urethane (meth)acrylamide is 500 or more, a strong secondary resin layer tends to be more easily formed, and when the Mn is 6000 or less, the Young's modulus of the secondary resin layer tends to be more easily increased. The Mn of the urethane (meth)acrylamide may be 1500 or more or 2000 or more, and may be 3500 or less or 3000 or less.

The content of the urethane (meth)acrylamide is preferably 5 parts by mass to 60 parts by mass, more preferably 10 parts by mass to 55 parts by mass, and still more preferably 15 parts by mass to 50 parts by mass based on 100 parts by mass of the total amount of the resin composition in terms of forming a secondary resin layer having a higher Young's modulus and more excellent external damage resistance.

The photopolymerizable compound according to the embodiment of the present disclosure may further include a urethane (meth)acrylate. The urethane (meth)acrylate is an urethane oligomer having a (meth)acryloyloxy group. The urethane (meth)acrylate may be obtained by reacting polyol, diisocyanate, and hydroxyl group-containing (meth)acrylate according to a conventional method.

The polyol, the diisocyanate, and the hydroxyl group-containing (meth)acrylate used in the synthesis of the urethane (meth)acrylate are not particularly limited, and may be selected from the compounds exemplified in the synthesis of the urethane (meth)acrylamide described above.

The photopolymerizable compound according to the embodiment of the present disclosure may further include a photopolymerizable compound having no urethane bond (hereinafter referred to as a "monomer"). Examples of the monomer include a (meth)acrylic acid ester, an N-vinyl compound, and a (meth)acrylamide compound. The monomer may be a monofunctional monomer having one photopolymerizable and ethylenically unsaturated group, or may be a polyfunctional monomer having two or more photopolymerizable and ethylenically unsaturated groups.

For the photopolymerizable compound, (meth)acrylic acid ester is preferably used as a monomer in terms of applying appropriate toughness to the secondary resin layer. Examples of the (meth)acrylic acid ester include a monofunctional (meth)acrylic acid ester and a polyfunctional (meth)acrylic acid ester. The (meth)acrylic acid ester may be used alone, or two or more kinds thereof.

Examples of the monofunctional (meth)acrylic acid ester include methyl (meth)acrylate, ethyl (meth)acrylate, propyl (meth)acrylate, n-butyl (meth)acrylate, s-butyl (meth)acrylate, t-butyl (meth)acrylate, isobutyl (meth)acrylate, n-pentyl (meth)acrylate, isopentyl (meth)acrylate, hexyl (meth) acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth) acrylate, phenoxyethyl (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate (for example, the commercial name "ARONIX M-113" produced by TOAGOSEI CO., LTD.), nonylphenoxypolyethylene glycol (meth)acrylate, tri(meth) acrylate, 3-phenoxybenzyl (meth)acrylate, methylphenoxy ethyl (meth)acrylate, phenoxydiethylene glycol (meth)acrylate, phenoxypolyethylene glycol (meth)acrylate, m-phenoxybenzyl (meth)acrylate, 2-(2-ethoxyethoxy)ethyl (meth) acrylate, 2-hydroxy-3-phenoxypropyl acrylate, carboxyethyl (meth)acrylate, carboxypentyl (meth)acrylate, and ω-carboxypolycaprolactone (meth)acrylate.

Examples of the polyfunctional (meth)acrylic acid ester include difunctional (meth)acrylic acid esters such as ethylene glycol di(meth)acrylate, polyethylene glycol di(meth) acrylate, polypropylene glycol di(meth)acrylate, neopentyl glycol di(meth)acrylate, tripropylene glycol di(meth)acrylate, triethylene glycol di(meth)acrylate, cyclohexanedimethanol di(meth)acrylate, dipropylene glycol di(meth)acrylate, tetraethylene glycol di(meth)acrylate, hydroxypivalate neopentyl glycol di(meth)acrylate, 1,3-butylene glycol di(meth)acrylate, 1,4-butanediol di(meth)acrylate, diethylene glycol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-haxadecanediol di(meth)acrylate, 1,20-eicosanediol di(meth)acrylate, isopentyldiol di(meth)acrylate, 3-ethyl-1, 8-octanediol di(meth)acrylate, tricyclodecanol di(meth) acrylate, 9,9-bis [4-(2-hydroxyethoxy)phenyl]fluorene di(meth)acrylate, bisphenol A-epoxy di(meth)acrylate, bisphenol F-epoxy di(meth)acrylate, bisphenol A-ethylene oxide adduct di(meth)acrylate, bisphenol F-ethylene oxide adduct di(meth)acrylate, bisphenol A-propylene oxide adduct di(meth)acrylate, bisphenol F-propylene oxide adduct di(meth)acrylate, the commercial names "EPDXY ESTER 40EM", "EPDXY ESTER 70PA", "EPDXY ESTER 200PA", "EPDXY ESTER 80MFA" produced by KYOE-ISHA CHEMICAL Co., LTD.); and (meth)acrylic acid esters having three or more functional groups such as trimethylolpropane tri(meth)acrylate, trimethyloloctane tri (meth)acrylate, trimethylolpropane polyethoxy tri(meth) acrylate, trimethylolpropane polypropoxy tri(meth)acrylate, trimethylolpropane polyethoxy polypropoxy tri(meth)acrylate, tris [(meth)acryloyloxyethyl] isocyanurate, pentaerythritol tri(meth)acrylate, pentaerythritol polyethoxy tetra(meth)acrylate, pentaerythritol polypropoxy tetra(meth) acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris [(meth)acryloyloxyethyl] isocyanurate.

From the viewpoint of applying appropriate toughness to the secondary resin layer, the (meth)acrylic acid ester preferably contains a bisphenol skeleton-containing (meth)acrylate. The content of the bisphenol skeleton-containing (meth)acrylic acid ester may be 10 parts by weight or more, 15 parts by weight or more, or 20 parts by weight or more, and may be 70 parts by weight or less, 65 parts by weight or less, 60 parts by weight or less, 55 parts by weight or less, or 50 parts by weight or less, based on 100 parts by weight of the total amount of the resin composition.

The content of the (meth)acrylic acid ester may be 40 parts by weight or more, 45 parts by weight or more, 50 parts by weight or more, or 60 parts by weight or more, and may be 95 parts by weight or less, 90 parts by weight or less, 85 parts by weight or less, or 80 parts by weight or less, based on 100 parts by weight of the total amount of the resin composition.

Examples of the N-vinyl compound include N-vinylpyrrolidone, N-vinylcaprolactam, N-vinylmethyloxazolidinone, N-vinyl imidazole, and N-vinyl-N-methylacetamide.

When the photopolymerizable compound includes an N-vinyl compound, the curing rate of the resin composition may be further improved. The content of the N-vinyl compound is preferably 0 parts by mass to 30 parts by mass, more preferably 1 part by mass to 20 parts by mass based on 100 parts by mass of the total amount of the resin composition.

Examples of the (meth)acrylamide compound include dimethyl (meth)acrylamide, diethyl (meth)acrylamide, (meth)acryloylmorpholine, hydroxymethyl (meth)acrylamide, hydroxyethyl (meth)acrylamide, isopropyl (meth)acrylamide, dimethylaminopropyl (meth)acrylamide, dimethylaminopropyl acrylamide/methyl chloride salt, diacetone acrylamide, (meth)acryloylpiperidine, (meth)acryloylpyrrolidine, (meth)acrylamide, N-hexyl (meth)acrylamide, N-methyl (meth)acrylamide, N-butyl (meth)acrylamide, N-methylol (meth)acrylamide, and N-methylolpropane (meth)acrylamide.

When the photopolymerizable compound includes a (meth)acrylamide compound, the curing rate of the resin composition may be further improved. The content of the (meth)acrylamide compound is preferably 0 parts by mass to 30 parts by mass, more preferably 1 part by mass to 20 parts by mass based on 100 parts by mass of the total amount of the resin composition.

The photopolymerization initiator according to the embodiment of the present disclosure can be appropriately selected from known radical photopolymerization initiators and used. Examples of the photopolymerization initiator include 1-hydroxycyclohexyl phenyl ketone (commercial name: Omnirad 184, produced by IGM Resins B.V.), 2,2-dimethoxy-2-phenyl acetophenone (commercial name: Omnirad 651, produced by IGM Resins B.V.), 2,4,6-trimethylbenzoyl diphenylphosphine oxide (commercial name: Omnirad TPO, produced by IGM Resins B.V.), ethyl(2,4,6-trimethylbenzoyl)-phenyl phosphinate (commercial name: Omnirad TPO-L, produced by IGM Resins B.V.), 2-benzyl-2-dimethylamino-4'-morpholinobutyrophenone (commercial name: Omnirad 369, produced by IGM Resins B.V.), 2-dimethylamino-2-(4-methylbenzyl)-1-(4-morpholin-4-yl-phenyl)-butan-1-one (commercial name: Omnirad 379, produced by IGM Resins B.V.), bis(2,4,6-trimethylbenzoyl) phenylphosphine oxide (commercial name: Omnirad 819, produced by IGM Resins B.V.), and 2-methyl-1-[4-(meth-ylthio)phenyl]-2-morpholinopropan-1-one (commercial name: Omnirad 907, produced by IGM Resins B.V.).

The photopolymerization initiator may be used alone, or two or more kinds thereof. It is preferable that the photopolymerization initiator contains at least one selected from 2,4,6-trimethylbenzoyldiphenylphosphine oxide or 1-hydroxycyclohexyl phenyl ketone, since such a resin composition has excellent rapid curability.

The content of the photopolymerization initiator is preferably 0.2 parts by mass to 5 parts by mass, more preferably 0.3 parts by mass to 4 parts by mass, and still more preferably 0.4 parts by mass to 3 parts by mass based on 100 parts by mass of the total amount of the resin composition.

The resin composition according to the embodiment of the present disclosure may further contain a photoacid generator, a leveling agent, an antifoaming agent, an antioxidant, an ultraviolet absorber, and the like.

An onium salt having a structure of $A^+B^-$ may be used as the photoacid generator. Examples of the photoacid generator include sulfonium salts such as CPI-100P, CPI-110P (produced by San-Apro Ltd.), Omnicat 270 and Omnicat 290 (produced by IGM Resins B.V.); and iodonium salts such as Omnicat 250 (produced by IGM Resins B.V.), WPI-113, WPI-116, WPI-124, WPI-169, and WPI-170 (produced by FUJIFILM Wako Pure Chemical Corporation).

The viscosity of the resin composition according to the embodiment of the present disclosure at 25° C. is preferably 0.5 Pas to 10 Pas, more preferably 1 Pas to 9 Pas, from the viewpoint of coatability. The viscosity of the resin composition at 25° C. can be measured using a B-type viscosimeter ("Digital Viscosimeter DV-II" produced by Brookfield Engineering Laboratories, Inc.) under the conditions of spindle: No. 18 and rotational speed 10 rpm.

(Optical Fiber)

An optical fiber according to an embodiment of the present disclosure includes a glass fiber including a core and a cladding, a primary resin layer covering the glass fiber in contact with the glass fiber, and a secondary resin layer covering the primary resin layer.

FIG. 1 is a schematic cross-sectional view showing an example of an optical fiber according to an embodiment of the present disclosure. An optical fiber 10 includes a glass fiber 13 including a core 11 and a cladding 12, and a coating resin layer 16 including a primary resin layer 14 provided on the outer periphery of glass fiber 13 and a secondary resin layer 15 covering primary resin layer 14.

Cladding 12 surrounds core 11. Core 11 and cladding 12 mainly contain glass such as silica glass, and for example, germanium-added silica glass or pure silica glass can be used for core 11, and pure silica glass or fluorine-added silica glass can be used for cladding 12.

In FIG. 1, for example, the outside diameter (D2) of glass fiber 13 is about 100 μm to about 125 μm, and the outside diameter (D1) of core 11 constituting glass fiber 13 is about 7 μm to about 15 μm. The thickness of coating resin layer 16 is usually about 22 μm to about 70 μm. The thickness of each of primary resin layer 14 and secondary resin layer 15 may be about 5 μm to about 50 μm.

When the outer diameter of glass fiber 13 is about 125 μm and the thickness of coating resin layer 16 is 60 μm to 70 μm, the thickness of each of primary resin layer 14 and secondary resin layer 15 may be about 10 μm to about 50 μm. For example, the thickness of primary resin layer 14 may be 35 μm and the thickness of secondary resin layer 15 may be 25 μm. The outer diameter of optical fiber 10 may be about 245 μm to about 265 μm.

When the outer diameter of glass fiber 13 is about 125 μm and the thickness of coating resin layer 16 is 24 μm to 48 μm, the thickness of each of primary resin layer 14 and secondary resin layer 15 may be about 8 μm to about 38 μm. For example, the thickness of primary resin layer 14 may be 25 μm and the thickness of secondary resin layer 15 may be 10 μm. The outer diameter of optical fiber 10 may be about 173 μm to about 221 μm.

When the outer diameter of glass fiber 13 is about 100 μm and the thickness of coating resin layer 16 is 22 μm to 37 μm, the thickness of each of primary resin layer 14 and secondary resin layer 15 may be about 5 μm to about 32 μm. For example, the thickness of primary resin layer 14 may be 25 μm and the thickness of secondary resin layer 15 may be 10 μm. The outer diameter of optical fiber 10 may be about 144 μm to about 174 μm.

Secondary resin layer 15 includes a cured product of a resin composition according to the embodiment of the present disclosure. Secondary resin layer 15 can be formed by curing the resin composition according to the embodiment of the present disclosure. Secondary resin layer 15 has a high Young's modulus and excellent external damage resistance.

It is preferable that the Young's modulus of the secondary resin layer be 800 MPa or more at 23° C.±2° C., it is more preferable that the Young's modulus be 1000 MPa or more at 23° C.±2° C., and it is further preferable that the Young's modulus be 1200 MPa or more at 23° C.±2° C. from the viewpoint of improving the microbending resistance of the optical fiber. Although the upper limit of the Young's modulus of the secondary resin layer is not particularly limited, the upper limit may be 3000 MPa or less, 2500 MPa or less, or 2000 MPa or less at 23° C.±2° C. from the viewpoint of imparting moderate toughness to the secondary resin layer.

The Young's modulus of the secondary resin layer can be measured by the following method. First, the optical fiber is immersed in a mixed solvent of acetone and ethanol, and only the coating resin layer is drawn out in a cylindrical shape. Although the primary resin layer and the secondary resin layer are united at this time, the Young's modulus of the primary resin layer is 1/1000 to 1/10000 of the Young's modulus of the secondary resin layer, the Young's modulus of the primary resin layer is therefore negligible. Next, the solvent is removed from the coating resin layer by vacuum drying, a tensile test (the tensile speed is 1 mm/minute) can be performed at 23° C., and the Young's modulus can be calculated by a secant expression at 2.5% strain.

From the viewpoint of improving the heat resistance of the secondary resin layer, the Tg of the secondary resin layer is preferably 70° C. or higher, and more preferably 75° C. or higher. From the viewpoint of suppressing an increase in transmission loss of the optical fiber at a low temperature, the Tg of the secondary resin layer is preferably 105° C. or lower, and more preferably 95° C. or lower.

For example, primary resin layer 14 may be formed by curing a resin composition containing a photopolymerizable compound including a urethane (meth)acrylate, a photopolymerization initiator, and the like. The resin composition forming the primary resin layer has a different composition from the resin composition for the secondary coating. The resin composition for the primary coating can be prepared using conventionally known techniques.

The resin composition for the primary coating may contain a urethane (meth)acrylamide. Examples of the urethane (meth)acrylamide include a reactant of polyol, diisocyanate, and N-hydroxyalkyl (meth)acrylamide, and a reactant of polyol, diisocyanate, N-hydroxyalkyl (meth)acrylamide, and methanol.

From the viewpoint of improving the microbending resistance of the optical fiber, the Young's modulus of the primary resin layer is preferably 0.8 MPa or less and more preferably 0.5 MPa or less at 23° C.±2° C. When the Young's modulus of the primary resin layer exceeds 0.8

MPa, an external force is easily transmitted to the glass fiber, and the transmission loss due to microbending tends to increase.

In some cases, a plurality of optical fibers are arranged in parallel and integrated with a ribbon resin to form an optical fiber ribbon. The resin composition according to the present disclosure can also be used as a ribbon resin. As a result, when an external force is applied to the optical fiber ribbon, the sliding property and the wear resistance of the surface can be improved.

(Manufacturing Method of Optical Fiber)

A method for producing an optical fiber according to an embodiment of the present disclosure includes applying the resin composition according to the embodiment of the present disclosure to an outer periphery of a glass fiber including a core and a cladding, and curing the resin composition by ultraviolet irradiation after the applying. In addition, the resin composition according to the embodiment of the present disclosure is not directly applied on the glass fiber, but the resin composition for primary coating is directly applied on the glass fiber. That is, in the applying, a primary coating that contacts the glass fiber and a secondary coating that does not contact the glass fiber are formed by the resin composition according to the embodiment of the present disclosure are provided.

In the method for producing an optical fiber according to the embodiment of the present disclosure, the resin composition according to the embodiment of the present disclosure is used as the resin composition for the secondary coating. Thus, even when the manufacturing speed of the optical fiber is high (for example, when the linear velocity is 3000 m/min or more), the secondary resin layer having high Young's modulus and excellent external damage resistance can be formed, and the optical fiber having excellent producibility can be manufactured.

EXAMPLES

Hereinafter, the present disclosure will be described in more detail by showing the results of evaluation tests using Examples and Comparative Examples according to the present disclosure. It should be noted that the present disclosure is not limited to these examples.

[Synthesis of Urethane Acrylamide A for Secondary Resin Layer]

(A-1)

Polypropylene glycol having an Mn of 600 (PPG600, produced by SANYO CHEMICAL INDUSTRIES, LTD., commercial name: Sannix PP-600) and 2,4-tolylene diisocyanate (TDI) were mixed such that the molar ratio of NCO to OH (NCO/OH) was 2.0 and reacted at 60° C. for 1 hour to prepare an NCO end prepolymer. As a catalyst, dibutyltin dilaurate was added by 200 ppm with respect to the final total fed amount. Next, N-hydroxyethyl acrylamide (HEAA) was added so that the molar ratio of OH of HEAA to NCO of the NCO end prepolymer (HEAA/NCO) was 1.05, and the mixture was reacted at 60° C. for 1 hour to obtain urethane acrylamide (A-1) having Mn of 2200.

(A-2)

Urethane acrylamide (A-2) having Mn of 2900 was obtained in the same way as in the synthesis of (A-1) except that polypropylene glycol (PPG1000, produced by SANYO CHEMICAL INDUSTRIES, LTD., commercial name: Sannix PP-1000) having Mn of 1000 was used instead of PPG600.

(A-3)

Urethane acrylamide (A-3) having Mn of 5500 was obtained in the same way as in the synthesis of (A-1) except that polypropylene glycol (PPG2000, produced by SANYO CHEMICAL INDUSTRIES, LTD., commercial name: Sannix PP-2000) having Mn of 2000 was used instead of PPG600.

(A-4)

Urethane acrylamide (A-4) having Mn of 5400 was obtained in the same way as in the synthesis of (A-3) except that HEAA was added so that the molar ratio of OH of HEAA to NCO of the NCO end prepolymer (HEAA/NCO) was 0.55 and 2-hydroxyethyl acrylate (HEA) was added so that the molar ratio of OH of HEA to NCO of the NCO end prepolymer (HEA/NCO) was 0.5.

[Synthesis of Urethane Acrylate Y for Secondary Resin Layer]

(Y-1)

PPG600 and TDI were mixed so that the molar ratio of NCO to OH (NCO/OH) was 2.0, and the mixture was reacted at 60° C. for 1 hour to prepare an NCO end prepolymer. As a catalyst, dibutyltin dilaurate was added by 200 ppm with respect to the final total fed amount. Next, HEA was added so that the molar ratio of OH of HEA to NCO of the NCO end prepolymer (HEA/NCO) was 1.05, and the mixture was reacted at 60° C. for 1 hour to obtain urethane acrylate (Y-1) having Mn of 2200.

(Y-2)

Urethane acrylate (Y-2) having Mn of 2900 was obtained in the same way as in the synthesis of (Y-1) except that PPG1000 was used instead of PPG600.

(Y-3)

Urethane acrylate (Y-3) having Mn of 5400 was obtained in the same way as in (Y-1) except that PPG2000 was used instead of PPG600.

[Synthesis of Urethane Acrylamide Z for Primary Resin Layer]

Polypropylene glycol (PPG3000, produced by SANYO CHEMICAL INDUSTRIES, LTD., commercial name: SANNIX PP-3000) having Mn of 3000 and TDI were mixed so that the molar ratio of NCO to OH (NCO/OH) was 1.5, and the mixture was reacted at 60° C. for 1 hour to prepare an NCO end prepolymer. As a catalyst, dibutyltin dilaurate was added by 200 ppm with respect to the final total fed amount. Next, HEAA was added so that the molar ratio of OH of HEAA to NCO in the NCO end prepolymer (HEAA/NCO) was 0.65, methanol was added so that the molar ratio of OH of methanol to NCO in the NCO end prepolymer (MeOH/NCO) was 0.4, and the mixture was reacted at 60° C. for 1 hour to obtain urethane acrylamide Z having Mn of 11300.

(Measurement of Mn)

Mn of polyol is a value described in a catalog of each product. Mn of urethane acrylamide and urethane acrylate was measured using an ACQUITY APC RI system manufactured by Waters under the conditions of sample concentration: 0.2% by mass THF solution, injection volume: 20 μL, sample temperature: 15° C., mobile phase: THF, XT column for organic solvent: particle size 2.5 μm, pore size 450 Å, column inner diameter 4.6× column length 150 mm+particle size 2.5 μm, pore size 125 Å, column inner diameter 4.6× column length 150 mm+particle size 1.7 μm, pore size 45 Å, column inner diameter 4.6× column length 150 mm, column temperature: 40° C., flow velocity: 0.8 mL/min.

[Resin Composition for Secondary Coating]

As the (meth)acrylic acid ester, bisphenol A-epoxy di (meth)acrylate (produced by OSAKA ORGANIC CHEMICAL INDUSTRY LTD., commercial name: Viscoat #540), isobornyl acrylate, and tripropyleneglycol diacrylate were prepared. 2,4,6-trimethylbenzoyl diphenylphosphine oxide (Omnirad TPO) and 1-hydroxycyclohexyl phenyl ketone (Omnirad 184) were prepared as photopolymerization initiators. Each component was mixed in the blending amount (parts by mass) shown in Table 1 below to prepare a resin composition for secondary coating of each test example. Test Examples 1 to 6 correspond to Examples, and Test Examples 7 to 9 correspond to Comparative Examples.

[Resin Composition for Primary Coating]

A resin composition for primary coating was prepared by mixing 70 parts by mass of urethane oligomer Z, 18 parts by mass of nonylphenolpolyethyleneglycolacrylate (commercial name "ARONIX M-113" produced by TOAGOSEI CO., LTD.), 10 parts by mass of N-vinylcaprolactam, 1 part by mass of Omnirad TPO, and 1 part by mass of 3-acryloxypropyl trimethoxysilane.

[Production of Optical Fiber]

The resin composition for primary coating and the resin composition for secondary coating were applied to an outer circumferential surface of glass fiber 13 having a diameter of 125 μm. Then, each resin composition was cured by irradiation with ultraviolet rays to form coating resin layer 16 including primary resin layer 14 and secondary resin layer 15, thereby producing optical fiber 10. The thickness of primary resin layer 14 was 35 μm, and the thickness of secondary resin layer 15 was 25 μm. The optical fibers were produced by varying the linear velocities of 2500 m/min, 3000 m/min and 3500 m/min.

[Evaluation of Optical Fiber]

(Young's Modulus of Secondary Resin Layer)

The optical fiber was immersed in a mixed solvent of acetone and ethanol, and only the coating resin layer was drawn out in a cylindrical shape. Next, the solvents were removed from the coating resin layer by vacuum drying, and then a tensile test was performed at 23° C. (the tensile speed of 1 mm/min), and the Young's modulus was calculated by a secant expression at 2.5% strain.

(External Damage Resistance of Secondary Resin Layer)

The optical fiber was manufactured in 1000 km, and the case where the amount of shavings of the surface of the secondary resin layer on the manufacturing line was less than 1 g was evaluated as "A", and the case where it was equal to or more than 1 g was evaluated as "C".

TABLE 1

| | | Test examples | | | | | | | | |
|---|---|---|---|---|---|---|---|---|---|---|
| | | 1 | 2 | 3 | 4 | 5 | 6 | 7 | 8 | 9 |
| A-1 | | 20 | — | — | — | 10 | 50 | — | — | — |
| A-2 | | — | 20 | — | — | — | — | — | — | — |
| A-3 | | — | — | 20 | — | — | — | — | — | — |
| A-4 | | — | — | — | 20 | — | — | — | — | — |
| Y-1 | | — | — | — | — | — | — | 20 | — | — |
| Y-2 | | — | — | — | — | — | — | — | 20 | — |
| Y-3 | | — | — | — | — | — | — | — | — | 20 |
| Viscoat #540 | | 45 | 45 | 15 | 45 | 50 | 10 | 45 | 45 | 45 |
| Isobornyl acrylate | | 10 | 10 | 10 | 10 | 10 | 10 | 10 | 10 | 10 |
| Tripropyleneglycol diacrylate | | 23 | 23 | 23 | 23 | 30 | 30 | 23 | 23 | 23 |
| Omnirad TPO | | 1 | 1 | 1 | 1 | 1 | 1 | 1 | 1 | 1 |
| Omnirad 184 | | 1 | 1 | 1 | 1 | 1 | 1 | 1 | 1 | 1 |
| Young's | 2500 m/min | 1610 | 1360 | 990 | 950 | 1700 | 1330 | 1520 | 1280 | 930 |
| modulus | 3000 m/min | 1580 | 1320 | 970 | 910 | 1660 | 1300 | 1410 | 1150 | 830 |
| (MPa) | 3500 m/min | 1550 | 1290 | 930 | 860 | 1610 | 1270 | 1280 | 1090 | 760 |
| External | 2500 m/min | A | A | A | A | A | A | A | A | A |
| damage | 3000 m/min | A | A | A | A | A | A | C | C | C |
| resistance | 3500 m/min | A | A | A | A | A | A | C | C | C |

REFERENCE SIGNS LIST

10 Optical fiber
11 Core
12 Cladding
13 Glass fiber
14 Primary resin layer
15 Secondary resin layer
16 Coating resin layer

The invention claimed is:

1. An optical fiber comprising:
a glass fiber including a core and a cladding;
a primary resin layer covering the glass fiber so as to be in contact with the glass fiber; and
a secondary resin layer covering the primary resin layer;
wherein the secondary resin layer includes a cured product of a resin composition for secondary coating of the optical fiber, the resin composition comprising:
a photopolymerizable compound including a urethane (meth)acrylamide; and
a photopolymerization initiator,
wherein the urethane (meth)acrylamide has a (meth) acrylamide group at at least one end of a urethane bond, and
wherein a Young's modulus of the secondary resin layer is 800 MPa to 3000 MPa at 23° C. +2° C.

2. The optical fiber according to claim 1, wherein the urethane (meth)acrylamide includes a urethane oligomer having a (meth)acrylamide group at one end of a urethane bond, a urethane oligomer having (meth)acrylamide groups at both ends of a urethane bond, or a mixture of the urethane oligomers.

3. The optical fiber according to claim 2, wherein the urethane oligomer having a (meth)acrylamide group at one end of a urethane bond includes a urethane oligomer having a (meth)acrylamide group at one end of a urethane bond and having a (meth)acryloyloxy group at the other end.

4. The optical fiber according to claim 1, wherein the urethane (meth)acrylamide has a number-average molecular weight of 500 to 6000.

5. The optical fiber according to claim 1, wherein a content of the urethane (meth)acrylamide is 5 parts by mass to 60 parts by mass based on 100 parts by mass of a total amount of the resin composition.

6. The optical fiber according to claim 1, wherein the photopolymerizable compound further includes a (meth) acrylic acid ester.

7. The optical fiber according to claim 6, wherein the (meth)acrylic acid ester includes a (meth)acrylate having a bisphenol skeleton.

8. A method for producing an optical fiber, the method comprising:
applying a resin composition to an outer periphery of a glass fiber including a core and a cladding; and
curing the resin composition by ultraviolet irradiation after the applying, wherein the resin composition comprises:
a photopolymerizable compound including a urethane (meth)acrylamide; and
a photopolymerization initiator,
wherein the urethane (meth)acrylamide has a (meth) acrylamide group at at least one end of a urethane bond, and
wherein a Young's modulus of a cured product of the resin composition is 800 MPa to 3000 MPa at 23° C.±2° C.

9. The optical fiber according to claim 1, wherein a glass transition temperature of the secondary resin layer is 70° C. to 105° C.

* * * * *